(12) United States Patent
Seitz et al.

(10) Patent No.: US 7,277,186 B2
(45) Date of Patent: Oct. 2, 2007

(54) METHOD FOR THE INTERFEROMETRIC MEASUREMENT OF NON-ROTATIONALLY SYMMETRIC WAVEFRONT ERRORS

(75) Inventors: Guenther Seitz, Spiegelberg (DE); Wolfgang Otto, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 371 days.

(21) Appl. No.: 10/931,703

(22) Filed: Sep. 1, 2004

(65) Prior Publication Data
US 2005/0046867 A1  Mar. 3, 2005

Related U.S. Application Data

(63) Continuation-in-part of application No. 10/045,260, filed on Nov. 7, 2001, now Pat. No. 6,839,143.

(30) Foreign Application Priority Data
Nov. 25, 2000 (DE) .............................. 100 58 650

(51) Int. Cl.
*G01B 9/02* (2006.01)
(52) U.S. Cl. ...................................... 356/512
(58) Field of Classification Search ................ 356/489, 356/495, 512–515
See application file for complete search history.

(56) References Cited

U.S. PATENT DOCUMENTS 5,982,490 A    11/1999  Ichikawa et al.
6,839,143 B2 *  1/2005  Otto .......................... 356/512

FOREIGN PATENT DOCUMENTS

JP    8233552    9/1996

OTHER PUBLICATIONS

Calibration of symmetric and non-symmetric errors for interferometry of ultra-precise imaging systems, Phillion et al, proceedings of the SPIE, vol. 5869, pp. 1-12.*
Evans et al.; "Test optics error removal," *Applied Optics*, vol. 25 (7) pp. 1015-1021, Mar. 1, 1996.
Fritz, Bernard S.; "Absolute calibration of an optical flat," *Optical Engineering*, vol. 23 (4) pp. 379-383, Jul./Aug. 1984.
Schulz et al.; "Absolute flatness testing by the rotation method with optimal measuring-error compensation," vol. 31 (19) pp. 3767-3780, Jul. 1, 1993.
Freimann et al.; "Absolute measurement of no-comatic aspheric surface errors," *Optics Communications*, 161 (1999) pp. 106-114.

* cited by examiner

*Primary Examiner*—Samuel A. Turner
(74) *Attorney, Agent, or Firm*—Welsh & Katz, Ltd.

(57) ABSTRACT

The method serves for the interferometric measurement of non-rotationally symmetric wavefront errors on a specimen. The specimen is brought into a number of rotational positions, at least one measurement result being determined in each of the rotational positions and a mathematical evaluation of all measurement results is performed. The measurement results $(M_1 \ldots M_m; N_1 \ldots N_n)$ of each of the measurement series $(M, N)$ are determined respectively in mutually equidistant rotational positions of the specimen. The measurement results $(M_1 \ldots M_m, N_1 \ldots N_n)$ of each of the at least two measurement series $(M, N)$ are evaluated independently of one another for non-rotationally symmetric wavefront errors $(<W>_m, <W>_n)$ on the specimen, and a difference is computationally rotated m or n times and the results averaged out. At least one of the wavefront errors $(<W>_m, <W>_n)$ is corrected with the result $(<<W>_m-<W>_n>_m$ or $<<W>_m-<W>_n>_n)$ averaged in this way.

3 Claims, 2 Drawing Sheets

METHOD FOR THE INTERFEROMETRIC MEASUREMENT OF NON-ROTATIONALLY SYMMETRIC WAVEFRONT ERRORS

BACKGROUND OF THE INVENTION

1. Field of the Invention

The invention relates to a method for the interferometric measurement of non-rotationally symmetric wavefront errors on a specimen brought into a number of rotational positions, at least one measurement result being determined in each of the rotational positions, and a concluding mathematical evaluation of all measurement results being performed.

2. Description of the Related Art

A fundamental requirement of each precision measurement technique consists in determining the measurement instrument error. Provided for this purpose are standards whose error contributions are either known or can be separated from the measuring instrument error by suitable measuring methods. The error of the measuring instrument is determined from the respective measurement and the error of the respective standard. In many cases, however, no such standards are available, for which reason it is necessary to depend on methods for separating the contributions of measuring instrument errors and testing surface.

In the optical surface measuring technique, testing surfaces are measured with the aid of an interferometric measuring method. For this purpose, a shape-matched wavefront is aligned with the specimen, and the shape of the reflected wavefront is measured. In addition to the surface shape of the testing surface, errors of the measuring instrument are also found impressed onto this wavefront.

As regards the general prior art, reference is made to the publications by R. Freimann, B. Dörband, F. Höller: "Absolute measurement of Non-Comatic Aspheric Surface Errors", Optics Communication, 161, 106-114, 1999; and C. J. Evans, R. N. Kestner: "Test Optics Error Removal", Applied Optics, Vol. 35, 7, 1996; the JP 8-233552 and the U.S. Pat. No. 5,982,490.

The possibility in principle of using two independent measurement series is pointed out specifically on page 1018, 2nd paragraph, in the publication by Evans and Kestner listed above, although no specific method is named. Moreover, it is pointed out explicitly at this juncture that such a method requires specific assumptions on the errors to be expected, and a (mathematically complicated) fitting of the measured data.

SUMMARY OF THE INVENTION

Therefore the object of the invention is to provide a method for the interferometric measurement of the non-rotationally symmetric wavefront errors of optical surfaces in reflection and/or optical elements in transmission, which provides a higher accuracy than the generally known rotational position test with a comparable number of partial measurements, or which, with a significantly lower number of partial measurements, provides a comparable accuracy to the rotational position test.

According to the invention, this object is achieved by virtue of the fact that the measurement is carried out in at least two measurement series, the measurement results of each of the measurement series being determined in respectively mutually equidistant rotational positions of the specimen, each of the measurement series comprising a specific number n, m of measurements, and m and n being natural and mutually coprime numbers, the measurement results of each of the at least two measurement series being evaluated independently of one another for non-rotationally symmetric wavefront errors on the specimen, the difference of the at least two non-rotationally symmetric wavefront errors being formed, whereupon the difference that is formed is computationally rotated m times and the results are averaged out, and whereupon the wavefront errors is corrected with the result averaged in this way.

According to the invention, this object is also achieved. In this way instead of m times the difference is computationally rotated n times.

Through the use of at least two independent measurement series, each of which has a number of equidistant measurement points, it is here possible to achieve a significant improvement in the measurement accuracy and/or a reduction in the number of individual measurement points required.

To that end, each of the at least two measurement series has a specific number of measurement results, for example m and n in the case of two measurement series. Through these m+n measured rotational positions and a corresponding mathematical evaluation, it is now possible to achieve the situation that all non-rotationally symmetric errors of the specimen with the exception of the orders k·m·n can be established absolutely. In order to achieve the maximum achievable accuracy with a minimum number of measurements, the number of individual measurement results m and n must be mutually coprime.

Certainly, measurement methods with two measurement series M, N or three measurement series M, N, O are primarily to be regarded as an expedient application of the method according to the invention, although four, five, six or more measurement series are in principle also conceivable. In the case of two measurement series M, N which, for example, consist of a combination of m=5 measurements in the first measurement series M and n=7 measurements in the second measurement series N, a higher accuracy is achieved than in the case of a 12-position test, for example. With the proposed 5+7 measurements, one of the measurement results is furthermore duplicated, so that only 11 measurements in total need to be carried out here. With a corresponding 12-position test according to the prior art, all non-rotationally symmetric errors of the specimen up to the order k·12 can be established. With the cited example of the method according to the invention as a 5+7-position test, all errors with the exception of the orders k·5·7=k·35 can already be established with 11 measurements in total, i.e. one measurement less.

If this rotational position test is extended to three measurement series, for example with a 3+5+7-position test, then all errors up to the order k·3·5·7=k·105 can be established. In this test, only 13 measurements are necessary instead of the theoretical 15 measurements, since one of the measurements occurs three times. Hence, with approximately the same number of individual measurement results to be recorded, the accuracy of the measurement can be increased significantly with the method according to the invention, the entire circumference of the specimen furthermore being covered.

As an alternative to this, it would naturally also be possible to reduce the amount of measurement time through a corresponding reduction of the individual measurement results, for example a 3+4-position test which, since one measurement occurs twice, requires only 6 measurements. An accuracy up to errors of the order k·12 could likewise be achieved thereby, as in the previously known 12-position test. The decisive advantage here, however, is that the number of individual measurements, and therefore the required measurement time, for achieving a comparable accuracy is reduced by 50 percent without this requiring specific and complicated algorithms and software.

According to the invention, the object is also achieved by virtue of the fact that the specimen is measured in a first rotational position, whereupon, in a second step, for determining the odd orders of the non-rotationally symmetric wavefront components, the specimen is rotated by 180° and is measured, and, in k further steps (k=1, 2, 3 . . . ), for determining the non-rotationally symmetric wavefront components of the even orders $u*2^k$ the specimen is rotated by $360/2^{k+1}$ and is measured, u being a natural odd number and k any natural number.

The object is also achieved wherein after the measurement of the specimen in a first rotational position the non-rotationally symmetric wavefront components of the even orders $u*2^k$ are determined in a second step, and the odd orders of the non-rotationally symmetric wavefront components are determined in a third step.

Here, the method according to the invention for determining non-rotational symmetric surface components of a specimen is characterized by an exponential dependence of the last still correctly transmitted azimuthal order on the number of the partial measurements required therefore. In order, for example, to determine all non-rotationally symmetric wavefront orders up to and including order 255, only nine partial measurements are now required. If, for example, the number of partial measurements is raised to twelve, it is possible thereby to extract all non-rotationally symmetric wavefront components up to and including order 2047.

The number of partial measurements can be substantially reduced, and the measuring times for the absolute measurements of non-rotationally symmetric wavefront components can thereby be shortened by means of this method according to the invention. In this way, there is also a reduction in the influence of drift effects, and this leads to an improvement in absolute accuracy. A further advantage of the shortened overall measuring time is the saving in time resulting there from.

The method "works" with differences between interferometric individual measurements. In this case, the interferometer errors are not averaged out by summation over various rotational positions, but are subtracted with pixel accuracy. The application of this method is particularly advantageous if the interferometer error is greater than the error of the specimen. Any disturbing influence on the result can be ruled out here because the interferometer error is eliminated before the non-rotationally symmetric wavefront components of the specimen is ascertained.

Exemplary embodiments of the invention are explained in principle below in more detail with the aid of the drawings.

DETAILED DESCRIPTION

Figure 1:
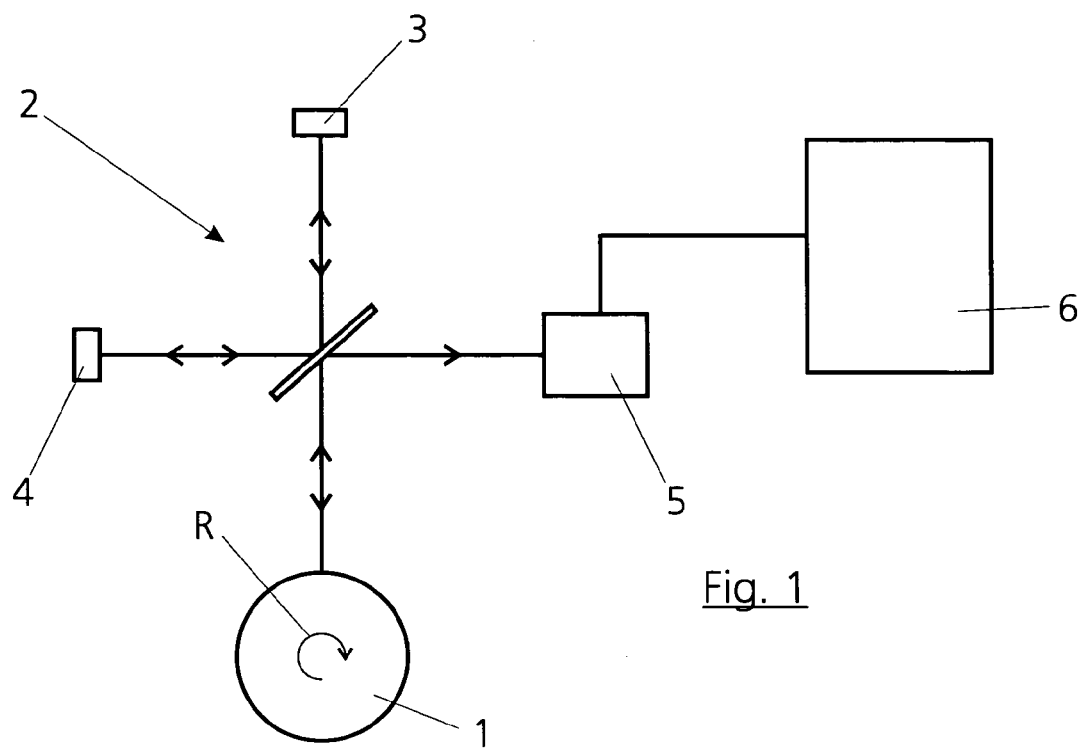
FIG. 1 shows a highly schematized representation of a measurement setup which is possible in principle.

FIG. 1 shows a highly schematized outline representation of a setup for carrying out the method for the interferometric measurement of non-rotationally symmetric wavefront errors on a specimen 1. An interferometric measuring instrument 2, indicated here in outline, is used for this. The interferometric measuring instrument 2 is schematically represented as a Michelson interferometer 2, although it may in principle be any other conceivable type of interferometric measuring instrument with the known facilities of splitting up the light paths, through semi-silvered mirrors, optical fibers, couplers or the like with open light paths or non-open light paths (e.g. fibre optic interferometer).

Besides a light source 3, the interferometric measuring instrument 2 has a reference element 4 and an instrument 5 for recording the interference pattern that is created. The instrument 5 is coupled to an evaluation unit 6 which, for example, is designed as an electronic data processing unit and in which the required mathematical evaluation of all measurement results can be carried out.

An arrow indicates the required relative rotational movement R between the interferometric measuring instrument 2 and the specimen 1, which needs to be carried out between the recording of the individual measurement results. The variant selected in this case for the schematic representation is the supposedly simple one in which the specimen 1 is rotated relative to the interferometric measuring instrument 2. It is, of course, also conceivable for the interferometric measuring instrument 2 to be rotated about the specimen 1.

Figure 2:
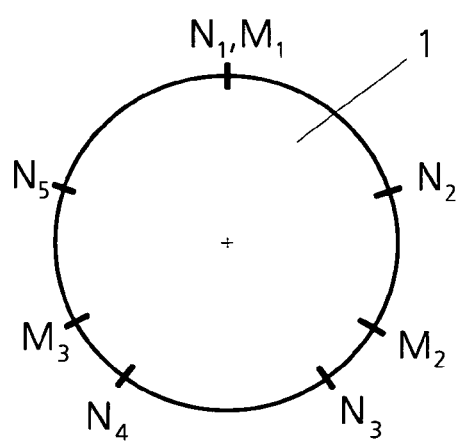
FIG. 2 shows the position of measurement points on a specimen using the example of a 3+5-position test.

FIG. 2 represents the position of measurement points using the example of m=3 and n=5 individual measurements of two measurement series M, N, which, for each measurement series M, N, are arranged distributed at equidistant spacings or angular positions over the entire circumference of the specimen 1.

In principle, the sequence in which the individual measurement values $M_1 \ldots M_m$, $N_1 \ldots N_n$ are recorded is unimportant in this case. It is, however, expedient for stability, and therefore the measurement reliability to be achieved in the setup, if the rotational direction of the relative rotational movement R between the interferometric measuring instrument 2 and the specimen 1 is maintained throughout the entire measurement.

In the exemplary embodiment represented, it could therefore be expedient to carry out the measurements in the sequence $M_1$, $M_2$, $M_3$, $N_2$, $N_3$, $N_4$, $N_5$. The measurement $N_1$ can in this case be omitted, since it is precisely this measurement result which is already known from the measurement $M_1$. By maintaining the rotational direction and the rotational angles, which are respectively equidistant within a measurement series, it is hence possible to achieve a very high stability of the setup in the method, which represents a good prerequisite for qualitative high-value measurement results. With this procedure, in which first of all the m equidistant spacings of one measurement series M and then the n or (n−1) equidistant spacings of the other measurement series N are addressed, however, the situation arises that the specimen 1 needs to be rotated completely at least two times relative to the interferometric measuring instrument 2. Nevertheless, good reproducibility can be achieved here because of the angular spacings that can respectively be set equidistantly.

In principle, however, it is also conceivable to carry out the measurement method with only one rotation of the specimen 1, in which case the individual measurement positions according to the example in FIG. 2 are then addressed in the sequence $M_1$, $N_2$, $M_2$, $N_3$, $N_4$, $M_3$, $N_5$. Since the individual measuring points of each of the measurement series M, N need to be mutually equidistant and measurement points from the two measurement series M, N are now determined in mixed fashion, the required mechanical accuracy of the setup for carrying out the relative rotational movements R is in this case somewhat higher, since the measurement points to be successively recorded no longer lie at a mutually equidistant spacing from each other here, and this situation is more difficult to implement with the required accuracy and reproducibility.

The achievable measurement accuracy of the described method and a description of the possibilities for evaluating the measurement results that are obtained will be given below with the aid of mathematical algorithms.

Basically, in any interferometric testing of the specimen 1 for wavefront errors, the measured wavefront $$W=P+T$$

can be represented as a sum of the wavefront errors of the specimen:

$$P=P_r+P_{nr}$$

and of the interferometer:

$$T=T_r+T_{nr}.$$

In this case, $P_r$ and $T_r$ respectively denote the rotationally symmetric component) $P_{nr}$ and $T_{nr}$ of the non-rotationally symmetric component of the measured wavefront. For representation of the wavefront in a sum notation, the following is hence obtained:

$$W=T_r+T_{nr}+P_r+P_{nr} \qquad (1).$$

Now if, in a measurement according to the prior art, m rotational positions at an azimuthal spacing of 360°/m are measured and averaged out, then all non-rotationally symmetric errors of the specimen 1 drop out, with the exception of the orders k·m·e (with k=1, 2, 3, . . . ), which gives:

$$<W>_m=T_r+T_{nr}+P_r+P_{nr}^{kme} \qquad (2).$$

In order to determine the error of the specimen 1, equation (2) can now be subtracted from equation (1), and all non-rotationally symmetric errors of the specimen 1 up to the orders k·m·e are obtained with:

$$W-<W>_m=P_{nr}-P_{nr}^{kme} \qquad (3).$$

If e.g. the rotational position test with m=12 rotational positions is assumed, then this means that all non-rotationally symmetric errors of the specimen 1 up to the orders 12, 24, 36, . . . are obtained. This means that the errors in the vicinity of the $12^{th}$ periodicity, $24^{th}$ periodicity, $36^{th}$ periodicity etc. cannot be recorded with this measurement method.

If, in the method, a further measurement series with n rotational positions is now carried out in a similar way to the measurement described in the introduction, which is known from the prior art, then the following is obtained in a similar way to that described above:

$$<W>_n=T_r+T_{nr}+P_r+P_{nr}^{kne} \qquad (4).$$

and $$W-<W>_m=P_{nr}-P_{nr}^{kne} \qquad (5).$$

If the results of equations (2) and (4) are now subtracted from one another, the error contributions of the orders k·m·e and k·n·e are obtained, with the exception of the orders k·m·n·e that are actually contained in both of the measurement series M, N, with:

$$<W>_m-<W>_n=P_{nr}^{kme}-P_{nr}^{kne} \qquad (6).$$

A prerequisite for this, of course, is that m and n are coprime numbers.

If this wavefront described by equation (6) is now computationally rotated m times, for example with the aid of a corresponding software program, and the results are averaged out, then the k·n·e terms drop out.

If the result obtained is added to equation (3), then the non-rotationally symmetric errors of the specimen 1, with the exception of the k·m·n·e terms, are obtained with:

$$W_m=W-<W>_m+<<W>_n-<W>_n>_m=P_{nr}-P_{nr}^{kmne} \qquad (7).$$

In a similar way to this, it is naturally also possible to calculate the result for n rotational positions, in order to use it for further averaging or for analysis.

This method hence offers the opportunity, merely with a number of measurements m+n, to determine in absolute terms all non-rotationally symmetric errors of the specimen 1, with the exception of the orders k·n·m. A combination of 5+7 measurements, which corresponds to 11 individual measurements because of the one measurement that occurs twice, is therefore much more accurate than the rotational position test with, for example, 12 measurement points.

As an alternative to this, of course, it is also possible to achieve similar accuracies to the aforementioned 12-position test with fewer individual measurements, for example, 3+4 measurements. Since, however, only 6 measurement points are needed for this, one of the theoretical 7 measurement points occurring twice, the required measurement time, or the required measurement work, can be halved.

An alternative formulation will be described below, which is obtained when the individual measurements according to equation (1) are computationally rotated back to a common azimuthal position before being determined. In this case, the non-rotationally symmetric interferometer errors, with the exception of the orders k·m·e, are removed:

$$<W>_m=T_r+T_{nr}^{kme}+P_r+P_{nr} \qquad (8).$$

If the mean radial profile of the wavefront $$W_{RP}=T_r+P_r \qquad (9)$$

is now computationally established, and is subtracted from the wavefront according to equation (8), then all non-rotationally symmetric errors of the specimen 1 and, in addition, also the non-rotationally symmetric errors of the interferometer 2 of the orders k·m·e, are obtained with:

$$<W>_m-W_{RP}=P_{nr}+T_{nr}^{kme} \qquad (10).$$

If the same procedure is performed in a similar way with n rotational positions, then this gives:

$$<W>_n=T_r+P_r+P_{nr}+T_{nr}^{kne} \qquad (11)$$

and $$<W>_n-W_{RP}=P_{nr}+T_{nr}^{kne} \qquad (12).$$

If the two results of equations (8) and (11) are now subtracted from one another, the error contributions of the orders k·m·e and k·n·e, with the exception of the orders k·m·n·e, are obtained so long as m and n are again coprime numbers, since these are contained in both of the measurement series M, N, as:

$$<W>_m-<W>_n=T_{nr}^{kme}-T_{nr}^{kne} \qquad (13).$$

If the wavefront described by equation (13) is now computationally rotated m times and averaged out, the k·n·e terms again drop out. One could say that the determined error is again subjected to a rotational position test, albeit on a purely mathematical or virtual basis.

Subtracting the result from equation (10) gives, with:

$$W_m = <W>_m - W_{RP} <<W>_m - <W>_n>_m = P_{nr} + T^{kmne} \quad (14)$$

The non-rotationally symmetric errors of the specimen, including the k·m·n·e terms of the interferometer error. Here again, the result for n rotational positions can be calculated in a similar way to this, in order to use it for further averaging or for analysis.

The error can, of course, be further minimized by additional rotational positions. For instance, even higher accuracies can be achieved with three measurement series M, N, O. With a 3+5+7-position test, i.e. with m=3, n=5 and o=7 individual measurements, all errors up to the orders k·105 can be determined. Since three of the individual measurements occur twice, 13 measurement points in total are sufficient to achieve the corresponding accuracy. Here as well, it is again assumed that the numbers m, n, o are coprime natural numbers.

If n+m measurements are now combined, as indicated above, then the non-rotationally symmetric errors of the specimen 1, with the exception of the k·m·n·e terms, are obtained in a similar way to equation (7) with:

$$W_M = W - <W>_m + <<W>_m - <W>_n>_m = P_{nr} - P_{nr}^{kmne} \quad (15).$$

Furthermore, the non-rotationally symmetric errors of the specimen 1 with the exception of the k·n·o·e terms, are obtained from the combination of the measurements n +o:

$$W_o = W - <W>_o + <<W>_o - <W>_n>_o = P_{nr} - P_{nr}^{knoe} \quad (16).$$

If the two equations (15) and (16) are now subtracted from one another, the error contributions of the orders k·m·n·e and k·n·o·e, with the exception of the orders k-m-n-o-e since these are actually contained in both results, are obtained with:

$$W_o - W_M = P_{nr}^{knme} - P_{nr}^{knoe} \quad (17).$$

If this wavefront described by equation (17) is now also computationally rotated m times and averaged out, the k·n·o·e terms drop out. By adding the result to equation (15), the non-rotationally symmetric errors of the specimen 1, with the exception of the k·m·n·o·e terms, are obtained in a similar way to equation (7), with:

$$W_{mn} = W - <W>_m + <<W>_m - <W>_n>_m + <W_o - W_M> = P_{nr} - P_{nr}^{knoe} \quad (18).$$

Here again, the results for n rotational positions can naturally be calculated and used for further averaging or for analysis, as already mentioned above.

Again here as well, algorithms which take into account the non-rotationally symmetric interferometer errors with three measurement series can be achieved by computational rotation to a common azimuthal position, in a similar way to the procedure with two measurement series M, N. Corresponding algorithms for measurement methods having more than three measurement series M, N, O, . . . are likewise obtained in a similar way to the possibilities described above.

Figure 3:
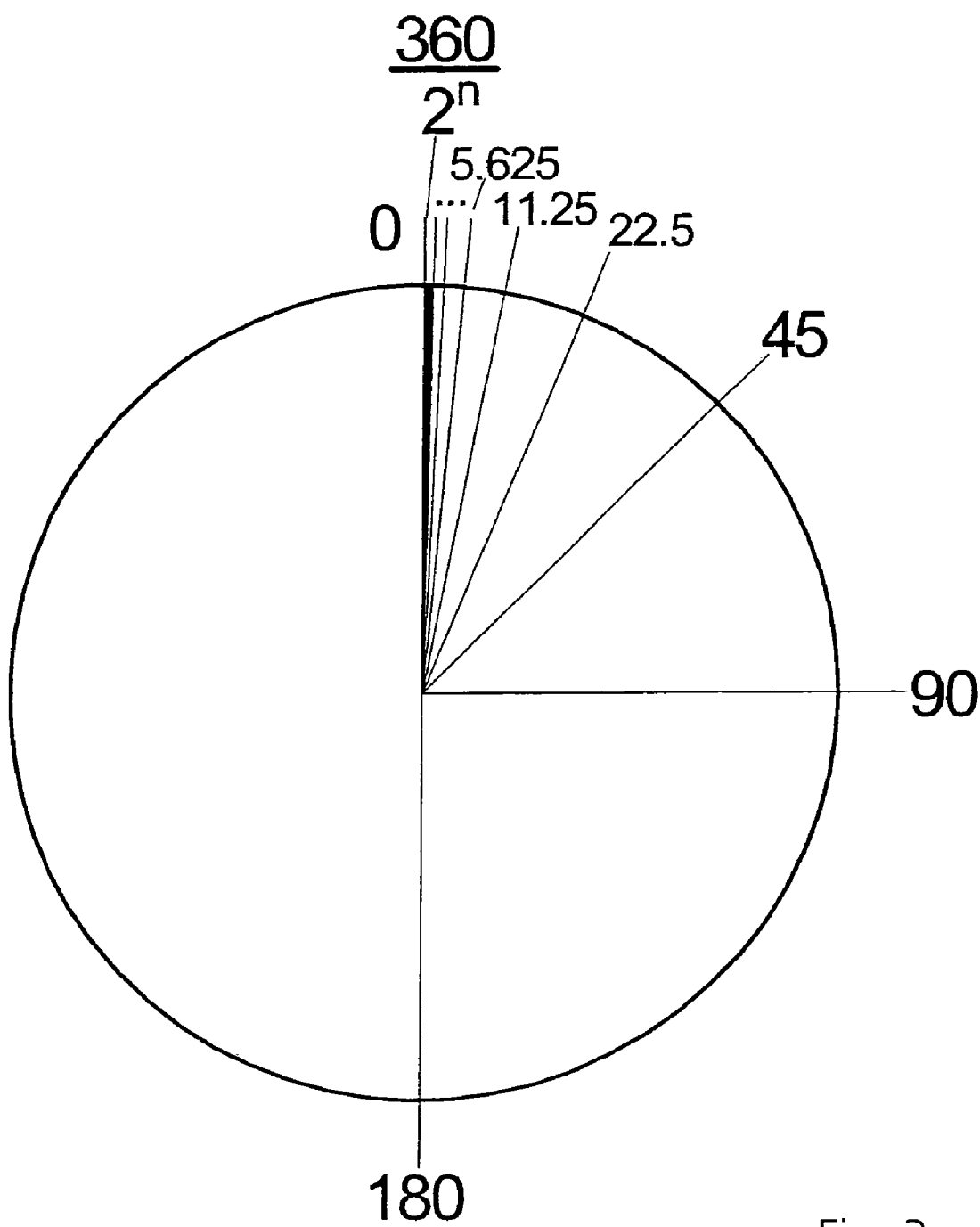
FIG. 3 shows the measuring positions of a specimen for a $2^n$ rotationally averaging measurement.

FIG. 3 illustrates the rotational angles of the partial measurements covered for the 2″ rotational averaging method, only two partial measurements being required to determine the non-rotationally symmetric wavefront components of the specimen 1.

The measuring accuracy to be targeted for the described measuring method, and a description of the possibilities for evaluating the targeted measurement results are to be represented below with the aid of mathematical algorithms here, as well.

The wavefront $W_0$ determined according to FIG. 1 by means of the interferometric measuring instrument 2 can be split into the errors P of the specimen 1 and into the errors T of the interferometric measuring instrument 2, a distinction being made between rotationally symmetric and non-rotationally symmetric wavefront components in accordance with the following formula (19):

$$W_o = P_r + P_{nr}(\theta) + T_r + T_{nr} \quad (19).$$

In this case, $P_r$ and $T_r$ respectively denote the rotationally symmetric component, and $P_{nr}$ and $T_{nr}$ the non-rotationally symmetric component of the measured wavefront $W_o$.

The specimen 1 is now measured in a first rotational position, for example at θ=0°, and thereafter rotated by an arbitrary angle α and measured once again. In order to illuminate the rotationally symmetric wavefront components of the specimen 1, as well as the rotational symmetric and non-rotational symmetric interferometer errors, the measured value $W_\alpha$ that was determined at an angle α is subtracted from the measured value $W_0$ that was determined for 0°. The result of this is that only the non-rotationally symmetric specimen error remains, in accordance with equation (20):

$$W_0 - W_\alpha = P_{nr}(\theta) - P_{nr}(\theta + \alpha) \quad (20).$$

All rotational symmetric errors of the specimen 1 and of the interferometric measuring instrument 2 thus drop out, as do the non-rotational symmetric errors of the interferometric measuring instrument 2. Consequently, in this way the interferometer errors are eliminated by a design of the rotationally symmetric surface components of the specimen 1 on the basis of forming a difference.

On the basis of this principle, the odd orders of the non-rotationally symmetric wavefront components $P_{nr}(\theta)$ of the specimen 1 are determined in a further step. For this purpose, the specimen 1 is measured at a rotational angle of θ=0°, the result being a first partial measurement $W_0$. Thereafter, the specimen 1 is rotated by 180° (θ=180°), and a second measurement $\omega_{180}$ is carried out. In this case, the rotational angle θ=180° corresponds to half a period of the first order (single wave property), as a result of which the sign of the odd non-rotationally symmetric wavefront components of the specimen 1 is inverted, and the following equation is obtained:

$$P_{nr}(1*\theta + 180) = -P_{nr}(1*\theta) \quad (21).$$

The number 1 in front of the rotational angle θ in equation (21) stands for the single wave property, it also being possible for the number 1 to be replaced by an arbitrary odd number.

If the difference of the partial measurements of the specimen 1 at 0° and at 180° is now formed, the following result:

$$W_0 - W_{180} = 2*P_{nr}(1*\theta) \quad (23)$$

Is obtained with the aid of $$W_0 - W_{180} = P_{nr}(1*\theta) - P_{nr}(1*\theta+180) \quad (22)$$

that is to say a doubling of this wavefront order.

However, this property holds not only for the single wave property as just set forth by equations (21) to (23) but also for all the other odd orders of the wavefront with $P*(q+1/2)=180°$, P corresponding to the period=$360°/n$, and q being a whole natural number. The property therefore also holds for the 3-wave property, 5-wave property, 7-wave property, etc.

The following two cases are to be distinguished as a function of the order n of the non-rotationally symmetric wavefront:

$P_{nr}(n*\theta+180) = -P_{nr}(n*\theta)$, when n is an odd natural number, and $P_{nr}(n*\theta+180) = P_{nr}(n*\theta)$, when n is an even natural number. $\quad (24)$ The result for the difference $$P_{nr}(n*\theta) - P_{nr}(n*\theta+180) \quad (25)$$

of the equations (24) is therefore:

$P_{nr}(n*\theta) - P_{nr}(n*\theta+180) = 2*P_{nr}(n*\theta)$, when n is an odd natural number, and $P_{nr}(n*\theta) - P_{nr}(n*\theta+180) = 0$, when n is an even natural number $\quad (26)$, the non-rotationally symmetric wavefront order $P_{nr}(n*\theta)$ being doubled when an odd natural number is used for n. $P_{nr}(n*\theta)$ vanishes in the case of an even natural number n.

The difference of the partial measurements $W_0$ and $W_{180}$:

$$P1(n*\theta) \equiv 1/2*(W_0-W_{180}) = 1/2*(P_{nr}(n*\theta)-P_{nr}(n*\theta+180)) \quad (27)$$

therefore includes all odd orders of the non-rotationally symmetric wavefront components of the specimen 1. Consequently, all odd orders (single wave property, 3-wave property, 5-wave property, 7-wave property, . . . ) of the non-rotationally symmetric wavefront components are determined. Not determined, however, are all even orders of the non-rotationally symmetric wavefront components of the specimen 1 that are to be determined by means of the following equations.

All the even orders $2^k$ with k=1, 2, 3, 4, 5, . . . of the wavefront components of the specimen 1 will be determined using the procedure described below. For this purpose, further measurements $W_{360/(2^{k+1})}$ are carried out after rotating the specimen 1 by $360/2^{k+1}$° in accordance with FIG. 3, and subtracted again from the measurement at 0°:

$$W_0 - W_{360/(2^{k+1})} = P_{nr}(n*\theta) - P_{nr}(n*\theta+360/2^{k+1}) \quad (28).$$

Depending on which (even) order of the non-rotationally symmetric wavefront that is to be determined, it is necessary to select a specific whole number for k, for example k=1 must be set in order to determine the two-wave property. An example for determining the two-wave property will be explained in more detail later.

The difference in accordance with equation (28) contains all the even orders of the non-rotationally symmetric wavefront components of the specimen 1 with $P*q \neq 360/2^{k+1}$, P corresponding to the period length=$360/n°$, and q being a whole natural number. It holds for the even orders or wave properties with $P*(q+1/2)=360/2^{k+1}°$ that:

$$P_{nr}(n*\theta+360/2^{k+1}) = -P_{nr}(n*\theta) \quad (29)$$

Three cases are to be distinguished thereby:

1. $P_{nr}(n*\theta) - P_{nr}(n*\theta+360/2^{k+1}) = 2*P(n*\theta)$, for $n = u*2^k$ where u=1, 3, 5, . . . odd number 2. $P_{nr}(n*\theta) - P_{nr}(n*\theta+360/2^{k+1}) = 0$, for $n = g*2k$ with g=2, 4, 6, . . . even number 3. $P_{nr}(n*\theta) - P_{nr}(n*\theta+360/2^{k+1}) < > 0$ for all remaining values of n. $\quad (30)$ If the differential wavefront $$Dk(\theta) \equiv 1/2*(P_{nr}(n*\theta) - P_{nr}(n*+360/2^{k+1})) = 1/2*(W_0 - W_{360/(2^{k+1})}) \quad (31)$$

described by equation (31) is now rotated further computationally $(2^k-1)$ times by the angle increment $360/2^{k+1}°$ with the aid of an appropriate software program, for example, and averaged arithmetically over all the wavefronts thus obtained, including the unrotated wavefront, it is only whole multiples of the $2^k$ wave property that remain in the resultant wavefront:

$$Pk(\theta) = (1/2^k)*(Dk(\theta)+Dk(\theta+360/2^k)+Dk(\theta+2*360/2^k)+ \ldots +Dk(\theta+(2^k-1)*360/2^k)) \quad (32).$$

The difference, averaged over $2^k$ rotational positions of the interferometer measurements $W_0$ and $W_{360/(2^{k+1})}$, thus contains all the even orders $u*2^k$ with u=1, 3, 5, 7, . . . (odd number) of the non-rotationally symmetric wavefront components of the specimen 1.

If k=1, 2, 3, 4, 5, . . . , is selected, the result is the 2*u, 4*u, 8*u, 16*u, 32*u . . . order or wave property of the non-rotationally symmetric wavefront components with u=1, 3, 5, 7, . . . odd. The following total result PM($\theta$) in accordance with equation (33) results from adding up all the rotationally averaging partial results of the respective even orders according to the equation (32) plus the odd orders P1($\theta$) according to equation (27):

$$PM(\theta) = P1(\theta) + P2(\theta) + P4(\theta) + P8(\theta) + \ldots + Pk_{(\theta)} \quad (33).$$

As an example, equations (28) to (32) are to be used below to determine the two-wave property plus their odd multiples.

The first step in this is to measure the specimen 1 at 0°. A further measurement is carried out after rotating the specimen 1 by 90°, this measurement result being subtracted from the measurement result at 0°:

$$W_0 - W_{90} = P_{nr}(n*\theta) - P_{nr}(n*\theta+90) \quad (34).$$

This differential result therefore again includes all the wave properties with $P*q \neq 90°$, with P corresponding to the period length=$360°/n$, and q being a whole number. For wave properties with $P*(q+1/2)=90°$, it holds further that:

$$P_{nr}(n*\theta+90) = -P_{nr}(n*\theta) \quad (35).$$

Three cases are therefore again to be distinguished after forming the difference of equations (34) and (35):

1. $P_{nr}(n*\theta) - P_{nr}(n*\theta+90) = 2*P_{nr}(n*\theta)$ for $n=2*u$ with u=1, 3, 5 . . . odd number 2. $P_{nr}(n*\theta) - P_{nr}(n*\theta+90) = 0$, for $n=2*g$ with g=2, 4, 6, . . . even number 3. $P_{nr}(n*\theta) - P_{nr}(n*\theta+90) < > 0$ for all remaining values of n. $\quad (36)$ Case 1 therefore relates to the orders 2*u with u=1, 3, 5, 7, . . . , which means that the equation in accordance with case 1 includes the orders 2, 6, 10, . . . The case 2 includes the orders 2*g with g=2, 4, 6, . . . , that is to say the equation in accordance with case 2 includes the orders 4, 8, 12, . . . . . Case 3 includes all the other orders that are not covered by cases 1 and 2.

The difference of the measurement results $W_0$ for 0° and $W_{90}$ for 90° therefore includes a superposition of all the three cases. In order now to average the difference out of case 3, that is to say to obtain the pure 2*u wave property, the latter is isolated by rotational averaging, as already mentioned. Thus, averaging is carried out computationally over two rotational positions using $$D2(\theta) \equiv (-1/2*(P_{nr}(n*\theta) - P_{nr}(n*\theta+90)) = 1/2*(W_0 - W_{90}) \quad (37),$$

and this means that the 2-wave property and multiples thereof are determined:

$$P2(\theta) \equiv 1/2*(D2(\theta) + D2(\theta+180)) \quad (38).$$

The result of equation (38) $P2(\theta)$, which represents the difference of the interferometer measurements $W_0$ and $W_{90}$ degrees rotationally averaged over two rotational positions therefore includes the wave properties 2, 6, 10, . . . or 2*u with u=1, 3, 5, 7, . . . odd.

The further even orders (4-wave property, 6-wave property, 8-wave property, . . . ) of the non-rotationally symmetric wavefront components of the specimen 1 can also be determined in accordance with the representation of the example for determining the two-wave property. Adding up these results yields the result for all the even orders of the non-rotationally symmetric wavefront components of the specimen 1. The complete non-rotationally symmetric wavefront is obtained by adding the odd orders according to equation (27) for this partial result in accordance with equation (33).

The following individual measurements are to be executed depending on the maximum number of measurements M:

Measurements for
1. $360/2^0=0$
2. $360/2^1=180° \rightarrow u*1$ wave property (u=1, 3, 5, . . . odd)
3. $360/2^2=90° \rightarrow u*2$ wave property
4. $360/2^3=45° \rightarrow u*4$ wave property
5. $360/2^4=22.5° \rightarrow u*8$ wave property
Mth measurement for $360/2^{M-1\circ} \rightarrow u*2^{M-2}$ wave property However, it is also possible to determine the even orders of the non-rotationally symmetric wavefront components of the specimen 1 after eliminating the interferometer errors and before determining the odd orders of the non-rotationally symmetric wavefront components of the specimen 1. Procedure for this purpose can be similar to the determination of the orders as respectively described.

By comparison with the known rotational averaging method, this method offers the possibility of detecting more orders of the non-rotationally symmetric wavefront components of specimen 1 with a smaller number of measurements. For example, all the orders up to the azimuthal order 15 can be determined or detected in absolute terms with only five partial measurements. In order, for example, to average over all the orders up to 255, only nine individual measurements are required, the result being a substantially more accurate measurement result than delivered by the known rotationally averaging method for the same number of partial measurements.

Of course, it is also possible as an alternative to carry out more or fewer individual measurements.

What is claimed is:

1. A method for the interferometric measurement of non-rotationally symmetric wavefront components of order $u*2^k$ with k being a natural number including zero and u being a natural odd number on a specimen brought into two rotational positions, at least one measurement result being determined in both rotational positions, whereas in a first step a measurement is taken in a first rotational position, whereupon in a second step the specimen is rotated by $360/2^{(k+1)}$ degrees and measured, whereas the difference of both measurements is divided by 2 and averaged with $(2^k-1)$ data maps, obtained by rotating the same difference computationally by $1*360/2^k, 2*360/2^k, \ldots, (2^k-1)*360/2^k$ degrees with the average result containing all non rotational wavefront components of the specimen with orders $u*2^k$.

2. The method as claimed in claim 1, applied for k=0, 1, 2, . . . K, wherein the K results are added together to obtain all non rotational wavefront components of the specimen up to orders $2^K-1$ completely.

3. The method as claimed in claim 1, wherein an interferometric absolute measurement is carried out.

* * * * *

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 2, Line 66

Please delete "... order k-12 could ..." and insert --... order k•12 could ...--

Column 5, Line 36
Please delete "... <W>m= Tr+Tnr+Pr+Pnrkme(2)." and insert

--<W>m= Tr+Tnr+Pr+Pnrkme--

Column 6, Line 11

Please delete "Wm= W - <W>m+ <<W>n - <W>n >m =Pnr – Pnrkmne" and insert

--Wm= W - <W>m+ <<W>m - <W>n >m = Pnr –    Pnrkmne--

Column 6, Line 18

Please delete "...orders k-n-m. ..." and insert --... orders k•n•m. ...--

Column 6, Line 60

Please delete "...orders k-m-n-e, ..." and insert --... orders k•m•n•e,. ...--

Column 7, Line 5

Please delete "Wm = <W>m- WRP <<W>m-<W>n>m = Pnr + Tkmne" and insert

--Wm = <W>m- WRP - <<W>m-<W>n>m = Pnr + Tkmne--

Column 7, Line 33

Please delete "Wo = W- <Wo> + <<W>o-<W>n>o = Pnr – Pnrknoe" and insert

--Wo = W- <W>o + <<W>o-<W>n>o = Pnr – Pnrknoe--

Column 7, Line 37

Please delete "... orders k-m-n-o-e since ..." and insert --... orders k•m•n•o•e since ...--

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 7, Line 50

Please delete "Wmn = W- <W>m + <<W>m-<W>n>m + <Wo – WM> = Pnr – Pnrkmoe    (18)."
and insert --Wmn = W- <W>m + <<W>m-<W>n>m + <Wo – WM> = Pnr – Pnrkmnoe (18).--

Column 9, Line 63

Please delete "... P*q ≠ 360/2k+1 ..." and insert --... P*q ≠ 360/2k+1° ...--

Column 10, Line 4

Please delete "... n = g*2k ..." and insert -- ... n = g*2k ...--

Column 10, Line 11

Please delete "... Dk(θ) ≡ 1/2*Pnr (n* θ) – Pnr (n* + 360/2k+1) ) = 1/2*W0 – W360/ (2k+1) )" and insert --... Dk(φ) ≡ 1/2*Pnr (n*φ) – Pnr (n*φ+ 360/2k+1) ) = 1/2*W0– W360/ (2k+1) )--

Column 10, Line 21

Please delete "... Dk(θ +(2k-1),*360/2)." and insert --... Dk(φ+(2k-1)*360/2)).--

Column 10, Line 37

Please delete "PM(θ)=P1(θ)+P2(θ)+P4(θ)+P8(θ)+ ... +Pk(θ)." and insert --PM(θ)=P1(θ)+P2(θ)+P4(θ)+P8(θ)+ ... +Pk(φ).--

Column 11, Line 11

Please delete "D2(θ) ≡ (-1/2*(Pnr(n* θ) - Pnr(n* θ +90)) = 1/2*(W0 – W90)." and insert --D2(φ) ≡ (1/2*(Pnr(n* φ) - Pnr(n* φ +90)) = 1/2*(W0 – W90).--

Column 11, Line 38

Please delete "1.360/2°=0" and insert --1.360/2°=0°--

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 11, Line 43

After "5. 360/24= 22.5°→ u*8 wave property" please insert --...--

Signed and Sealed this

Twenty-fourth Day of June, 2008

JON W. DUDAS
*Director of the United States Patent and Trademark Office*

UNITED STATES PATENT AND TRADEMARK OFFICE
CERTIFICATE OF CORRECTION

PATENT NO.       : 7,277,186 B2
APPLICATION NO.  : 10/931703
DATED            : October 2, 2007
INVENTOR(S)      : Guenther Seitz and Wolfgang Otto It is certified that error appears in the above-identified patent and that said Letters Patent is hereby corrected as shown below:

Column 8, Line 17
Please delete "$W_o=P_r+P_{nr}(\theta)+T_r+T_{nr}$" and insert --$W_o=P_r+P_{nr}(\varphi)+T_r+T_{nr}$--

Column 8, Line 24
Please delete "... $\theta=0$ ..." and insert --... $\varphi=0$ ...--

Column 8, Line 35
Please delete "$W_o-W_a=P_{nr}(\theta)-P_{nr}(\theta+a)$" and insert --$W_o-W_a=P_{nr}(\varphi)-P_{nr}(\varphi+a)$--

Column 8, Line 45
Please delete "... $P_{nr}(\theta)$ ..." and insert --... $P_{nr}(\varphi)$ ...--

Column 8, Line 48
Please delete "... $\theta=0°$ ..." and insert --...$\varphi=0°$ ...--

Column 8, Line 49
Please delete "... $180°$ ($\theta=180°$) ..." and insert --... $180°$ ($\varphi=180°$) ...--

Column 8, Line 51
Please delete "... $\theta=180°$ ..." and insert --... $\varphi=180°$ ...--

Column 8, Line 57
Please delete "$P_{nr}(1*\theta+180)=-P_{nr}(1*\theta)$" and insert -- $P_{nr}(1*\varphi+180)=-P_{nr}(1*\varphi)$ --

Column 8, Line 59
Please delete " ... angle $\theta$ ... " and insert -- ... angle $\varphi$ ... --

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 8, Line 66
Please delete " $W_o\text{-}W_{180}\text{+}=2*P_{nr}(1*\theta)$ " and insert -- $W_o\text{-}W_{180}\text{+}=2*P_{nr}(1*\varphi)$ --

Column 9, Line 2
Please delete " $W_o\text{-}W_{180}=P_{nr}(1*\theta)\text{-} P_{nr}(1*\theta+180)$ " and insert -- $W_o\text{-}W_{180}=P_{nr}(1*\varphi)\text{-} P_{nr}(1*\varphi+180)$ --

Column 9, Line 15
Please delete " $P_{nr}(n*\theta+180)=\text{-} P_{nr}(n*\theta) \ldots$ " and insert -- $P_{nr}(n*\varphi +180)=\text{-} P_{nr}(n*\varphi) \ldots$ --

Column 9, Line 23
Please delete " $P_{nr}(n*\theta+180)=\text{-} P_{nr}(n*\theta) \ldots$ " and insert -- $P_{nr}(n*\varphi +180)=\text{-} P_{nr}(n*\varphi) \ldots$ --

Column 9, Line 25
Please delete " $P_{nr}(n*\theta)\text{-} P_{nr}(n*\theta+180)=2* P_{nr}(n*\theta) \ldots$ " and insert -- $P_{nr}(n*\varphi)\text{-} P_{nr}(n*\varphi +180)=2* P_{nr}(n* \varphi) \ldots$ --

Column 9, Line 26
Please delete " $P_{nr}(n*\theta)\text{-} P_{nr}(n*\theta+180)=0 \ldots$ " and insert -- $P_{nr}(n*\varphi)\text{-} P_{nr}(n*\varphi +180)=0 \ldots$ --

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 9, Line 30
Please delete " ... $P_{nr}(n*\theta)$ ... " and insert -- ... $P_{nr}(n*\varphi)$ ... --

Column 9, Line 32
Please delete " ... $P_{nr}(n*\theta)$ ... " and insert -- ... $P_{nr}(n*\varphi)$ ... --

Column 9, Line 35
Please delete " $P1(n*\theta) \equiv 1/2*(W_o-W_{180}) = 1/2*(P_{nr}(n*\theta) - P_{nr}(n*\theta+180))$ "

and insert -- $P1(n*\varphi) \equiv 1/2*(W_o-W_{180}) = 1/2*(P_{nr}(n*\varphi) - P_{nr}(n*\varphi+180))$ --

Column 9, Line 53
Please delete " $W_o-W_{360/2^{k+1}} = P_{nr}(n*\theta) - P_{nr}(n*\theta+360/2^{k+1})$ "

and insert -- $W_o-W_{360/2^{k+1}} = P_{nr}(n*\varphi) - P_{nr}(n*\varphi+360/2^{k+1})$ --

Column 9, Line 63
Please delete " ... $P*q \neq 360/2^{k+1}$ ... " and insert -- ... $P*q \neq 360/2^{k+1}$° ... --

Column 9, Line 65
Please delete " ... $P*(q+1/2)=360/2^{k+1}$° ... " and insert -- ... $P*(q+1/2)=360/2^{k+1}$° ... --

Column 9, Line 66
Please delete " $P_{nr}(n*\theta+360/2^{k+1}) = -P_{nr}(n*\theta)$ " and insert -- $P_{nr}(n*\varphi+360/2^{k+1}) = -P_{nr}(n*\varphi)$ --

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 10, Line 2

Please delete " 1. $P_{nr}(n*\theta) - P_{nr}(n*\theta+360/2^{k+1}) = 2*P(n*\theta) \ldots$ "
and insert -- 1. $P_{nr}(n*\varphi) - P_{nr}(n*\varphi +360/2^{k+1}) = 2*P(n*\varphi) \ldots$ --

Column 10, Line 4
Please delete " $\ldots n = g*2k \ldots$ " and insert -- $\ldots n = g*2^k \ldots$ --

Column 10, Line 5
Please delete " 2. $P_{nr}(n*\theta) - P_{nr}(n*\theta+360/2^{k+1}) = 0 \ldots$ "
and insert -- 2. $P_{nr}(n*\varphi) - P_{nr}(n*\varphi +360/2^{k+1}) = 0 \ldots$ --

Column 10, Line 8
Please delete " 3. $P_{nr}(n*\theta) - P_{nr}(n*\theta+360/2^{k+1}) <> 0 \ldots$ "
and insert -- 3. $P_{nr}(n*\varphi) - P_{nr}(n*\varphi +360/2^{k+1}) <> 0 \ldots$ --

Column 10, Line 21
Please delete

" $Pk(\theta) = (1/2^k)*(Dk(\theta)+Dk(\theta+360/2^k)+Dk(\theta +2*360)/2^k)+ \ldots$ $+Dk(\theta +(2^{k-1}), *360)/2^k)$ "

and insert

-- $Pk(\varphi) = (1/2^k)*(Dk(\varphi)+Dk(\varphi +360/2^k)+Dk(\varphi +2*360)/2^k)+ \ldots$ $+Dk(\varphi +(2^{k-1}), *360)/2^k)$ --

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 10, Line 32
Please delete " ... $PM(\theta)$ ... " and insert -- ... $PM(\varphi)$ ... --

Column 10, Line 36
Please delete " $P1(\theta)$ ... " and insert -- $P1(\varphi)$ ... --

Column 10, Line 37
Please delete " $PM(\theta)=P1(\theta)+P2(\theta)+P4(\theta)+P8(\theta)+ \ldots +Pk_{(\theta)}$ "
and insert -- $PM(\varphi)=P1(\varphi)+P2(\varphi)+P4(\varphi)+P8(\varphi)+ \ldots +Pk_{(\varphi)}$ --

Column 10, Line 46
Please delete " $W_o-W_{90}= P_{nr}(n*\theta)- P_{nr}(n*\theta+90)$ " and insert -- $W_o-W_{90}= P_{nr}(n*\varphi)- P_{nr}(n*\varphi +90)$ --

Column 10, Line 52

Please delete " $P_{nr}(n*\theta+90)=- P_{nr}(n*\theta)$ " and insert -- $P_{nr}(n* \varphi +90)=- P_{nr}(n*\varphi)$ --

Column 10, Line 56

Please delete " 1. $P_{nr}(n*\theta)- P_{nr}(n*\theta+90)=2*P_{nr} (n*\theta) \ldots$ "

and insert -- 1. $P_{nr}(n*\varphi)- P_{nr}(n*\varphi +90)=2*P_{nr} (n*\varphi) \ldots$ --

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 10, Line 58

Please delete " $P_{nr}(n*\theta) - P_{nr}(n*\theta+90)=0 \ldots$ " and insert

-- $P_{nr}(n*\varphi) - P_{nr}(n*\varphi+90)=0 \ldots$ --

Column 10, Line 62

Please delete " $P_{nr}(n*\theta) - P_{nr}(n*\theta+90) <> 0 \ldots$ " and insert -- $P_{nr}(n*\varphi) - P_{nr}(n*\varphi+90) <> 0 \ldots$ --

Column 11, Line 12 and 13

Please delete " $D2(\theta) \equiv (-1/2*(P_{nr}(n*\theta) - P_{nr}(n*\theta+90))) = 1/2*(W_o - W_{90})$ "

and insert -- $D2(\varphi) \equiv (-1/2*(P_{nr}(n*\varphi) - P_{nr}(n*\varphi+90))) = 1/2*(W_o - W_{90})$ --

Column 11, Line 16

Please delete " $P2(\theta) \equiv 1/2*(D2(\theta) + D2(\theta+180))$ "

and insert -- $P2(\varphi) \equiv 1/2*(D2(\varphi) + D2(\varphi+180))$ --

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.      : 7,277,186 B2
APPLICATION NO. : 10/931703
DATED           : October 2, 2007
INVENTOR(S)     : Guenther Seitz and Wolfgang Otto It is certified that error appears in the above-identified patent and that said Letters Patent is hereby corrected as shown below:

Column 8, Line 17
Please delete "$W_o=P_r+P_{nr}(\theta)+T_r+T_{nr}$" and insert --$W_o=P_r+P_{nr}(\varphi)+T_r+T_{nr}$--

Column 8, Line 24
Please delete "... $\theta=0$ ..." and insert --... $\varphi=0$ ...--

Column 8, Line 35
Please delete "$W_o-W_a=P_{nr}(\varphi)-P_{nr}(\varphi+a)$" and insert --$W_o-W_\alpha=P_{nr}(\varphi)-P_{nr}(\varphi+\alpha)$--

Column 8, Line 45
Please delete "... $P_{nr}(\theta)$ ..." and insert --... $P_{nr}(\varphi)$ ...--

Column 8, Line 48
Please delete "... $\theta=0°$ ..." and insert --...$\varphi=0°$ ...--

Column 8, Line 49
Please delete "... 180° ($\theta=180°$) ..." and insert --... 180° ($\varphi=180°$) ...--

Column 8, Line 51
Please delete "... $\theta=180°$ ..." and insert --... $\varphi=180°$ ...--

Column 8, Line 57
Please delete "$P_{nr}(1*\theta+180)=-P_{nr}(1*\theta)$" and insert --$P_{nr}(1*\varphi+180)=-P_{nr}(1*\varphi)$--

Column 8, Line 59
Please delete " ... angle $\theta$ ... " and insert -- ... angle $\varphi$ ... --

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 8, Line 66
Please delete " $W_o-W_{180}+=2*P_{nr}(1*\theta)$ " and insert -- $W_o-W_{180}+=2*P_{nr}(1*\varphi)$ --

Column 9, Line 2
Please delete " $W_o-W_{180}=P_{nr}(1*\theta)-P_{nr}(1*\theta+180)$ " and insert -- $W_o-W_{180}=P_{nr}(1*\varphi)-P_{nr}(1*\varphi+180)$ --

Column 9, Line 15
Please delete " $P_{nr}(n*\theta+180)=-P_{nr}(n*\theta)\ldots$ " and insert -- $P_{nr}(n*\varphi+180)=-P_{nr}(n*\varphi)\ldots$ --

Column 9, Line 18/19
Please delete " $P_{nr}(n*\theta+180)=-P_{nr}(n*\theta)\ldots$ " and insert -- $P_{nr}(n*\varphi+180)=P_{nr}(n*\varphi)\ldots$ --

Column 9, Line 23
Please delete " $P_{nr}(n*\varphi+180)=-P_{nr}(n*\varphi)\ldots$ " and insert -- $P_{nr}(n*\varphi)-P_{nr}(n*\varphi+180)\ldots$ --

Column 9, Line 25
Please delete " $P_{nr}(n*\theta)-P_{nr}(n*\theta+180)=2*P_{nr}(n*\theta)\ldots$ " and insert -- $P_{nr}(n*\varphi)-P_{nr}(n*\varphi+180)=2*P_{nr}(n*\varphi)\ldots$ --

Column 9, Line 26
Please delete " $P_{nr}(n*\theta)-P_{nr}(n*\theta+180)=0\ldots$ " and insert -- $P_{nr}(n*\varphi)-P_{nr}(n*\varphi+180)=0\ldots$ --

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 9, Line 30
Please delete " … $P_{nr}(n*\theta)$ … " and insert -- … $P_{nr}(n*\varphi)$ … --

Column 9, Line 32
Please delete " … $P_{nr}(n*\theta)$ … " and insert -- … $P_{nr}(n*\varphi)$ … --

Column 9, Line 35
Please delete " $P1(n*\theta) \equiv 1/2*(W_o - W_{180}) = 1/2*(P_{nr}(n*\theta) - P_{nr}(n*\theta+180))$ "

and insert -- $P1(n*\varphi) \equiv 1/2*(W_o - W_{180}) = 1/2*(P_{nr}(n*\varphi) - P_{nr}(n*\varphi +180))$ --

Column 9, Line 53
Please delete " $W_o - W_{360/2^{k+1}} = P_{nr}(n*\theta) - P_{nr}(n*\theta+360/2^{k+1})$ "

and insert -- $W_o - W_{360/2^{k+1}} = P_{nr}(n*\varphi) - P_{nr}(n*\varphi +360/2^{k+1})$ --

Column 9, Line 63
Please delete "… $P*q \neq 360/2^{k+1}$° …" and insert --… $P*q \neq 360/2^{k+1°}$ …--

Column 9, Line 65
Please delete "… $P*(q+1/2) = 360/2^{k+1°}$ … " and insert --… $P*(q+1/2) = 360/2^{k+1°}$ …--

Column 9, Line 66
Please delete " $P_{nr}(n*\theta+360/2^{k+1}) = -P_{nr}(n*\theta)$ " and insert -- $P_{nr}(n*\varphi +360/2^{k+1}) = -P_{nr}(n*\varphi)$ --

UNITED STATES PATENT AND TRADEMARK OFFICE
CERTIFICATE OF CORRECTION

PATENT NO.        : 7,277,186 B2
APPLICATION NO. : 10/931703
DATED               : October 2, 2007
INVENTOR(S)      : Guenther Seitz and Wolfgang Otto It is certified that error appears in the above-identified patent and that said Letters Patent is hereby corrected as shown below:

Column 10, Line 2

Please delete " 1. $P_{nr}(n*\theta) - P_{nr}(n*\theta + 360/2^{k+1}) = 2*P(n*\theta) \ldots$ "
and insert -- 1. $P_{nr}(n*\varphi) - P_{nr}(n*\varphi + 360/2^{k+1}) = 2*P(n*\varphi) \ldots$ --

Column 10, Line 4
Please delete " $\ldots n = g*2k \ldots$ " and insert -- $\ldots n = g*2^k \ldots$ --

Column 10, Line 5
Please delete " 2. $P_{nr}(n*\theta) - P_{nr}(n*\theta + 360/2^{k+1}) = 0 \ldots$ "
and insert -- 2. $P_{nr}(n*\varphi) - P_{nr}(n*\varphi + 360/2^{k+1}) = 0 \ldots$ --

Column 10, Line 8
Please delete " 3. $P_{nr}(n*\theta) - P_{nr}(n*\theta + 360/2^{k+1}) <> 0 \ldots$ "
and insert -- 3. $P_{nr}(n*\varphi) - P_{nr}(n*\varphi + 360/2^{k+1}) <> 0 \ldots$ --

Column 10, Line 21
Please delete "$Pk(\varphi) = (1/2^k)*(Dk(\varphi) + Dk(\varphi + 360/2^k) + Dk(\varphi + 2*360)/2^k) + \ldots + Dk(\varphi + (2^{k-1}), *360)/2^k)$"

and insert --$Pk(\varphi) = (1/2^k)*(Dk(\varphi) + Dk(\varphi + 360/2^k) + Dk(\varphi + 2*360)/2^k) + \ldots + Dk(\varphi + (2^k-1) *360)/2^k))$--

UNITED STATES PATENT AND TRADEMARK OFFICE
CERTIFICATE OF CORRECTION

PATENT NO. : 7,277,186 B2
APPLICATION NO. : 10/931703
DATED : October 2, 2007
INVENTOR(S) : Guenther Seitz and Wolfgang Otto It is certified that error appears in the above-identified patent and that said Letters Patent is hereby corrected as shown below:

Column 10, Line 32
Please delete " ... $PM(\theta)$ ... " and insert -- ... $PM(\varphi)$ ... --

Column 10, Line 36
Please delete " $P1(\theta)$ ... " and insert -- $P1(\varphi)$ ... --

Column 10, Line 37
Please delete " $PM(\theta)=P1(\theta)+P2(\theta)+P4(\theta)+P8(\theta)+ \ldots +Pk_{(\theta)}$ "
and insert -- $PM(\varphi)=P1(\varphi)+P2(\varphi)+P4(\varphi)+P8(\varphi)+ \ldots +Pk_{(\varphi)}$ --

Column 10, Line 46
Please delete " $W_o - W_{90} = P_{nr}(n*\theta) - P_{nr}(n*\theta+90)$ " and insert -- $W_o - W_{90} = P_{nr}(n*\varphi) - P_{nr}(n*\varphi +90)$ --

Column 10, Line 52
Please delete " $P_{nr}(n*\theta+90) = -P_{nr}(n*\theta)$ " and insert -- $P_{nr}(n*\varphi +90) = -P_{nr}(n*\varphi)$ --

Column 10, Line 56
Please delete " 1. $P_{nr}(n*\theta) - P_{nr}(n*\theta+90) = 2*P_{nr}(n*\theta)$ ... "

and insert -- 1. $P_{nr}(n*\varphi) - P_{nr}(n*\varphi +90) = 2*P_{nr}(n*\varphi)$ ... --

UNITED STATES PATENT AND TRADEMARK OFFICE
CERTIFICATE OF CORRECTION

PATENT NO.      : 7,277,186 B2
APPLICATION NO. : 10/931703
DATED           : October 2, 2007
INVENTOR(S)     : Guenther Seitz and Wolfgang Otto It is certified that error appears in the above-identified patent and that said Letters Patent is hereby corrected as shown below:

Column 10, Line 58

Please delete " $P_{nr}(n*\theta) - P_{nr}(n*\theta+90) = 0 \ldots$ " and insert -- $P_{nr}(n*\varphi) - P_{nr}(n*\varphi +90) = 0 \ldots$ --

Column 10, Line 62

Please delete " $P_{nr}(n*\theta) - P_{nr}(n*\theta+90) <> 0 \ldots$ " and insert -- $P_{nr}(n*\varphi) - P_{nr}(n*\varphi +90) <> 0 \ldots$ --

Column 11, Line 12 and 13

Please delete " $D2(\theta) \equiv (-1/2*(P_{nr}(n*\theta) - P_{nr}(n*\theta+90))) = 1/2*(W_o - W_{90})$ "

and insert -- $D2(\varphi) \equiv (-1/2*(P_{nr}(n*\varphi) - P_{nr}(n*\varphi +90))) = 1/2*(W_o - W_{90})$ --

Column 11, Line 16

Please delete " $P2(\varphi) \equiv 1/2*(D2(\varphi) + D2(\varphi +180))$ "

and insert -- $P2(\varphi) \equiv 1/2*(D2(\varphi) + D2(\varphi +180))$ --

This certificate supersedes the Certificate of Correction issued April 14, 2009.

Signed and Sealed this

Twenty-ninth Day of December, 2009

David J. Kappos
*Director of the United States Patent and Trademark Office*